United States Patent
Kamath et al.

(10) Patent No.: US 9,665,542 B2
(45) Date of Patent: May 30, 2017

(54) DETERMINING MEDIAN VALUE OF AN ARRAY ON VECTOR SIMD ARCHITECTURES

(71) Applicant: Texas Instruments Incorporated, Dallas, TX (US)

(72) Inventors: Sanmati S. Kamath, Plano, TX (US); Anoop K. Pathayapurakkal, Bangalore, IN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 259 days.

(21) Appl. No.: 14/455,714

(22) Filed: Aug. 8, 2014

(65) Prior Publication Data
US 2015/0067008 A1  Mar. 5, 2015

Related U.S. Application Data

(60) Provisional application No. 61/874,090, filed on Sep. 5, 2013.

(51) Int. Cl.
| | |
|---|---|
| *G06F 7/00* | (2006.01) |
| *G06F 17/18* | (2006.01) |
| *G06T 1/20* | (2006.01) |
| *G06T 5/00* | (2006.01) |

(52) U.S. Cl.
CPC ........... *G06F 17/18* (2013.01); *G06T 1/20* (2013.01); *G06T 5/002* (2013.01)

(58) Field of Classification Search
CPC ........... G06F 17/18; G06T 1/20; G06T 5/002
USPC ........................................................ 708/202
See application file for complete search history.

(56) References Cited

U.S. PATENT DOCUMENTS

| | | | | |
|---|---|---|---|---|
| 6,058,405 A | * | 5/2000 | Kolte | G06T 5/20 382/262 |
| 6,163,324 A | * | 12/2000 | Holder | G06F 17/10 345/505 |
| 6,754,684 B1 | * | 6/2004 | Kotlov | G06T 5/20 708/202 |
| 9,031,349 B1 | * | 5/2015 | Ma | G06T 5/002 382/262 |

OTHER PUBLICATIONS

Donald Ervin Knuth, "The Art of Computer Programming", Second Edition, vol. 3, Sorting and Searching, 1998, Addison-Wesley Longman Publishing Co., Inc., pp. 207-219.

(Continued)

*Primary Examiner* — Tan V. Mai
(74) *Attorney, Agent, or Firm* — Gregory J. Albin; Charles A. Brill; Frank D. Cimino (57) ABSTRACT

A method for determining a median value of an array of pixels in a vision system may be performed in an efficient manner using the parallel computing capabilities of a SIMD processing engine. Each column of an array may be sorted in ascending (descending) order to form a first sorted array. Each row of the first sorted array may be sorted in ascending (descending) order to form a second sorted array. A pixel may be selected as the median value from a diagonal portion of the second sorted array, wherein the diagonal portion bisects a lower value region and a higher value region of the second sorted array.

15 Claims, 8 Drawing Sheets

(56) References Cited

OTHER PUBLICATIONS

"SIMD", Wikipedia, pp. 1-7, available at http://en.wikipedia.org/w/index.php?title=SIMD&oldid=605330941 on Apr. 22, 2014.
"ADAS Applications Processor TDA2x System-on-Chip Technical Brief", TDA2, Texas Instruments, Inc., SPRT680, Oct. 2013, pp. 1-4.
"Empowering automotive vision with TI's Vision AccelerationPac", Texas Instruments White Paper, Texas Instruments Inc., SPRY251, Oct. 2013, pp. 1-8.

* cited by examiner

| 157 | 41  | 25  | 22  | 3   |
|-----|-----|-----|-----|-----|
| 158 | 90  | 58  | 51  | 34  |
| 165 | 104 | 124 | 162 | 93  |
| 251 | 206 | 169 | 166 | 150 |
| 255 | 240 | 233 | 231 | 156 |

| 3   | 22  | 25  | 41  | 157 |
|-----|-----|-----|-----|-----|
| 34  | 51  | 58  | 90  | 158 |
| 93  | 104 | 124 | 162 | 165 |
| 150 | 166 | 169 | 206 | 251 |
| 156 | 231 | 233 | 240 | 255 |

| 3   | 22  | 25  | 41  | 157 |
|-----|-----|-----|-----|-----|
| 34  | 51  | 58  | 90  | 158 |
| 93  | 104 | 124 | 162 | 165 |
| 150 | 166 | 169 | 206 | 251 |
| 156 | 231 | 233 | 240 | 255 |

DETERMINING MEDIAN VALUE OF AN ARRAY ON VECTOR SIMD ARCHITECTURES

CROSS-REFERENCE TO RELATED APPLICATIONS

This application claims benefit of U.S. Provisional Patent Application Ser. No. 61/874,090, filed Sep. 5, 2013, entitled "A METHOD TO COMPUTE FAST MEDIAN 5×5 VALUE ON VECTOR SIMD ARCHITECTURES" which is incorporated herein by reference in its entirety.

BACKGROUND OF THE INVENTION

Field of the Invention

Embodiments of the present invention generally relate to determining a median value of an array using a single instruction, multiple data processing engine.

Description of the Related Art

Computing median values over 3×3, 5×5 and 7×7 blocks of pixels is an important step in many video and vision processing applications. Searching for the best matching patch between two arrays of image data is a common problem in image processing. For example, many stereoscopic imaging systems compute the disparity between left and right images by finding a two-dimensional (2D) patch in the right image that best matches a given 2D patch in the left image. In another example, the alignment of two three-dimensional (3D) point clouds may be accomplished by searching for the best 3D patch matches between the volumes. In another example, video compression algorithms may determine motion between two consecutive images using an optical flow algorithm that matches patches between the two images.

There are several common ways of computing a median value of an array. One method involves sorting all the values in the given block and thus finding the median value. Another method involves creating a histogram for the block and thus finding the median.

Single instruction, multiple data (SIMD) is a well known class of parallel computers. This includes computers with multiple processing elements that perform the same operation on multiple data points simultaneously in response to a single instruction. Thus, such machines exploit data level parallelism, but not concurrency of (separate) operations: there are simultaneous (parallel) computations, but only a single process (instruction) at a given moment. SIMD is particularly applicable to common tasks such as adjusting the contrast in a digital image or adjusting the volume of digital audio. Many modern CPU (central processing unit) designs include SIMD instructions in order to improve the performance of multimedia use.

SUMMARY

A method for determining a median value of an array of pixels in a vision system may be performed in an efficient manner using the parallel computing capabilities of a SIMD processing engine. Each column of an array may be sorted in ascending (descending) order to form a first sorted array. Each row of the first sorted array may be sorted in ascending (descending) order to form a second sorted array. A pixel may be selected as the median value from a diagonal portion of the second sorted array, wherein the diagonal portion bisects a lower value region and a higher value region of the second sorted array.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

The journey to commercialize the self-driving car is focused on how to make the autonomous car more affordable, more robust, and safer in every corner case. One of the key technologies to enable autonomous cars is computer vision, using camera-based vision analytics with the goal of providing highly reliable, low cost vision solutions. While the cost of the camera-based sensor is lower than other technologies, it comes with a huge increase in processing requirements. Today's systems may require processing image resolutions of 1280×800 at 30 frames/sec, often running five or more algorithms concurrently.

Advanced driver assistance systems (ADAS) are a key step towards fully autonomous vehicles. ADAS systems include but are not limited to Adaptive Cruise Control, Lane Keep Assist, Blind Spot Detection, Lane Departure Warning, Collision Warning System, Intelligent Speed Adaptation, Traffic Sign Recognition, Pedestrian Protection, and Object Detection, Adaptive Light Control and Automatic Parking Assistance systems, for example. Cameras provide a low-cost means to capture many of the traffic scenarios for intelligent analysis. Stereo front cameras may be used for adaptive cruise control to capture real-time traffic conditions to help maintain the optimal distance from the vehicle ahead. Front cameras may also be used for lane keep assist to keep the car centered in a lane, as well as for traffic sign recognition and object detection, for example. Side cameras may be used for cross-traffic monitoring, blind spot detection and pedestrian awareness, for example.

The analytics behind the cameras is what enables the car to have vision-like capabilities. A real-time vision analytics engine analyzes each video camera frame to extract the correct information for intelligent decisions. It not only needs enormous computing capacity to process data in the split second intervals required to allow a fast-moving vehicle to make the correct maneuver, it also needs wide I/O (input/output) to feed the vision analytics engine inputs from multiple cameras to allow simultaneous correlation. Low power, low latency, and reliability are also key aspects of the automotive vision systems.

Computing median values over 3×3, 5×5 and 7×7 blocks of pixels is an important step in many video and vision processing applications. A single instruction, multiple data (SIMD) processor may be used to process image data in various applications, such as vision processing for automotive driver assistance, manufacturing robotic control, video encoding and compression, security camera analysis, etc., for example. Embodiments of the invention provide a method in which a SIMD processor may efficiently determine a median value of an array of data, such as pixel data, for example.

Figure 1:
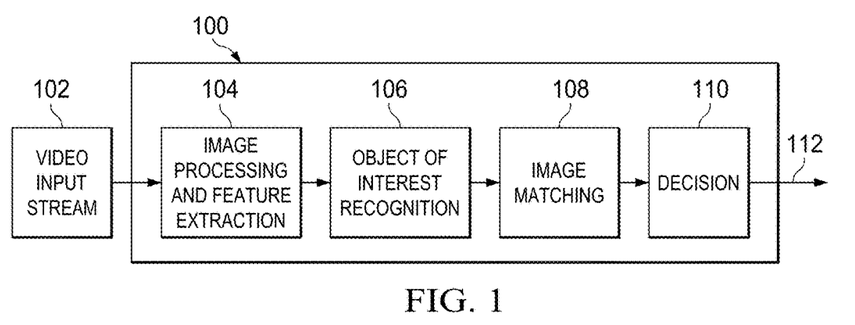
FIG. 1 is a flow diagram of a method for processing image data.

FIG. 1 is a diagram of a method for processing image data. A camera system 102 may acquire a stream of image frames 102 and provide them to an analytics subsystem 100 for image processing and analysis. A typical vision analytics processing flow involves several stages, including: image pre-processing and feature detection 104, object of interest recognition 106, image and pattern matching 108 and finally decision making 110, for example. Image preprocessing 104 may include noise removal, edge extraction, pixel-wise operation for enhancement of contrast and brightness, and thresholding, for example. Object of interest recognition 106 may include segmentation, filtering, image detection, image transformation, feature extraction, color analysis, and motion analysis, for example. Image matching 108 may include pattern recognition, dimension measurement, parameter estimation, and image registration, for example. Decision making 110 may include classification, floating point operation, matrix conversion, and machine learning, for example. As each decision is made, information 112 may be provided to an information processing subsystem, for example.

The general concepts of image processing as described above are well known. However, one or more of the steps described above may require the determination of a median value of a multitude of small arrays of pixels in the image data, as will be described in more detail below.

Figure 2:
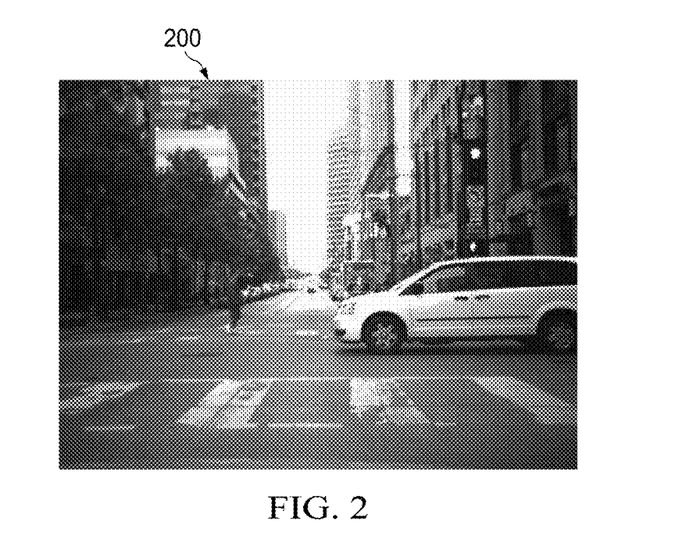
FIG. 2 is an example image.

FIG. 2 is an example image 200 that may be provided by camera 102 to analytic subsystem 100. In this example, camera 102 is mounted on the front of an automotive vehicle and is capturing images of what is in front of the automobile. In a typical driver assistance system, there may be multiple cameras 102 mounted on the front, sides, and rear of the vehicle, for example.

Figure 3:
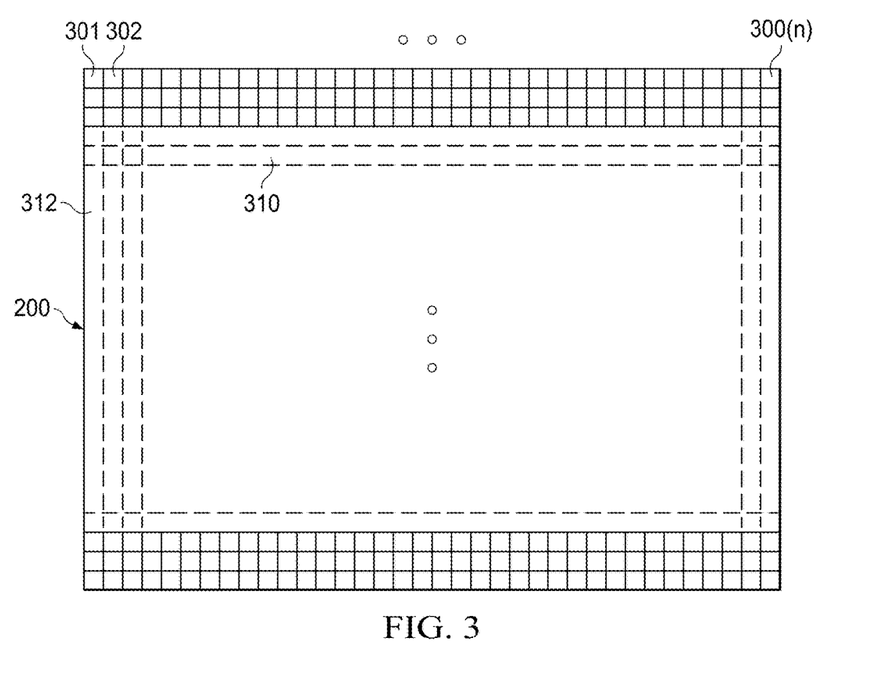
FIG. 3 is an illustration of a division of an image into small arrays of pixels.

FIG. 3 is an illustration of a division of an image, such as image 200, into multiple small arrays of pixels. The image data may be divided into rows as indicated at 310 and into columns as indicated at 312 to form multiple small arrays, such as array 301, 302, 300(n), etc., for example. In this example, the small arrays 300(n) are arranged to be adjacent to each other. In another example, the small arrays 300(n) may overlap adjacent neighbors on each row and/or on each column, for example. In this example, each small array 300(n) may be a 5×5 array of pixels, for example. In other examples, each small array 300(n) may be 3×3, 7×7, or another size array of pixels, for example.

Image data may include color information as red, green, blue (RGB) component values. Alternatively, a YUV model may be used that defines a color space in terms of one luminance (Y) and two chrominance (UV) components. In either case, each small array 300(n) may represent pixel data for one of the color components. Processing of the three components may be performed separately for each image, for example.

As mentioned above, there are several common ways of determining a median value of a group of numbers. One method involves sorting all the values in the given block and thus finding the median value. Another method involves creating a histogram for the block and thus finding the median.

A trivial bound on comparisons required to sort n pixels is (n−1). Sorting to obtain t lowest values, would require an upper bound of comparisons as expressed in equation (1), according to Donald Knuth: "The Art of Computer Programming", Volume 3: Sorting and Searching, Third Edition. Addison-Wesley, 1997. ISBN 0-201-89685-0. Section 5.3.3: Minimum-Comparison Selection, pp. 207-219.

$$W_t(n) = (n-t)\Sigma_{k=n+1-t}^{t} \log 2(k) \quad (1)$$

For a 3×3 median, this would mean approximately 18 comparisons. A 5×5 median computation would require (25−13)+3.7+3.8+3.9+4.0+4.08+4.16+ . . . +4.64 comparisons, approximately 66 comparisons. Typically, such sorting schemes would involve merge or shell sort type implementation.

For an array of numbers, computation of a median value is more complicated with data being in two dimensional (2D) format that needs to be accessed as a one dimensional (1D) array and then sorted. Moreover, in vision applications that utilize vector SIMD processing, there is the added requirement of multiple 5×5 blocks being computed in close juxtapositions, as illustrated in FIG. 3.

SIMD Implementation and Issues:

The general concept of Single Instruction Multiple Data (SIMD) computer architectures is well known and need not be described in detail herein; for example, see "SIMD", Wikipedia, updated 22 Apr. 2014. Members of the TMS320C6000 family of digital signal processors (DSP) from Texas Instruments include SIMD instructions. Another SIMD processor core available from Texas Instruments is a vector coprocessor (VCOP) that is included in the Embedded Vision Engine (EVE). The VCOP vector coprocessor is a Single Instruction Multiple Data (SIMD) engine with built-in loop control and address generation. It provides a dual 8-way SIMD with sixteen 16-bit multipliers per cycle, for 8 GMACS per second at 500-MHz frequency of sustained throughput, sustained by associated loads/stores and built-in zero-looping overheads with rounding and saturation. The EVE will be described in more detail below.

For computation of the median value of an array of data using a SIMD processor, some challenges arise. First of all, SIMD processors operate on blocks of data and may access data in horizontal or vertical strides. SIMD processing goes faster when memory addresses follow certain set patterns when traversing from one data point to the next. SIMD processing also typically operates on 8 or 16 pixels, or pixel counts that are a multiple of the SIMD width of the processor (for optimal performance).

At first glance, computing a median value for a 5×5 array of data seems to not fit efficiently on a SIMD system. Loading and processing five pixels on a processor with SIMD width eight amounts to three pixels being unused. On the other hand, for a SIMD processor with an operand width of 16, computing a median value on three 5×5 arrays may be done in parallel. However, the fact that sorting comparisons have to be carried out on 25 pixels for each 5×5 array breaks the addressing, or at least complicates it, with the result that performance of the algorithm degrades. Furthermore, it is not easy to make these comparisons operate in a SIMD manner due to the nature of the memory accesses and dependencies. Thus, many of the SIMD lanes produce data that is not useful and has to be ignored on each iteration, thereby reducing computation efficiency in increasing processing time. Generally, median computation on blocks greater that 3×3 on a SIMD processor is considered a hard problem because there are too many pixel accesses and each comparison depends on the result of the previous comparison for efficient operation using prior techniques.

Improved Median Calculation on SIMD:

FIGS. 4A-4D illustrate a method for determining a median value in a small array 400. In this example, array 400 is a 5×5 array of pixel values representative of any of the small arrays 300(n) illustrated in FIG. 3, for example. In this example, the color component data is represented by an eight bit number with a value ranging from 0-255. In other examples, the data range may be larger or smaller, as needed.

Figure 4A:
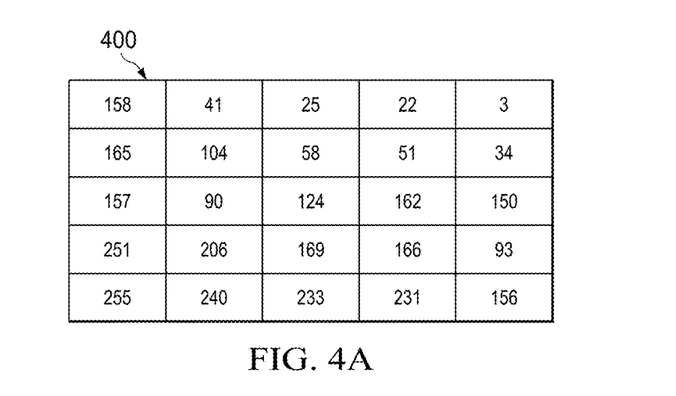
FIGS. 4A-4D illustrate a method for determining a median value in a small array.

A three step solution will now be described that operates efficiently within SIMD processor constraints. In this example, the five columns of each 5×5 input array 400 are mapped onto five lane positions of a SIMD processor. In this example, the SIMD processor may process up to eight columns of data.

In a first step, a vertical column sort is performed on all pixels of 5×5 array 400 by using five lanes of the SIMD processor. In this example, the sort is carried out over five rows worth of data for a 5×5 array and produces array 410 illustrated in FIG. 4B.

Figure 4B:
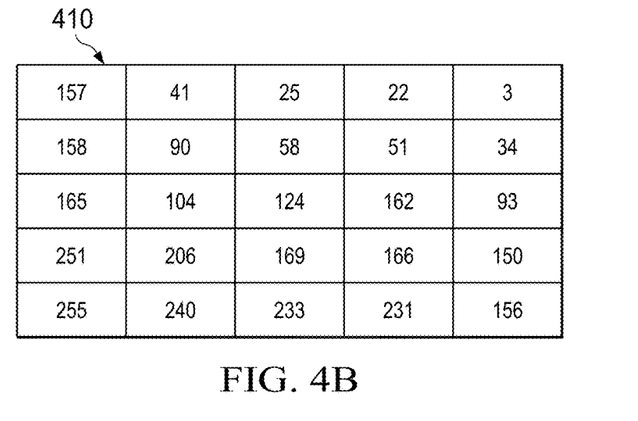
Figure 4C:
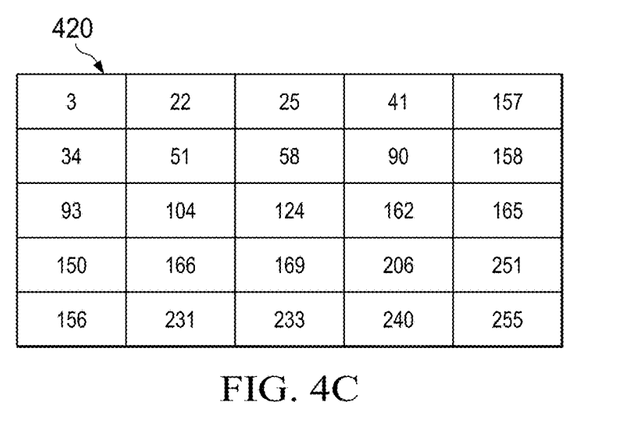

In a second step, a horizontal sort is performed on the output array 410 of Step 1 to form array 420 as illustrated in FIG. 4C. This sort may also be performed efficiently on the SIMD processor, as will be described in more detail below. After this step the pixels are now ordered in ascending order in both the vertical and horizontal directions.

As will be described later, some embodiments may transpose the results of the first step so that the second step may be performed as vertical sort. This may provide a more efficient process for a SIMD processor. Similarly, the results of the second step may also be transposed.

Figure 4D:
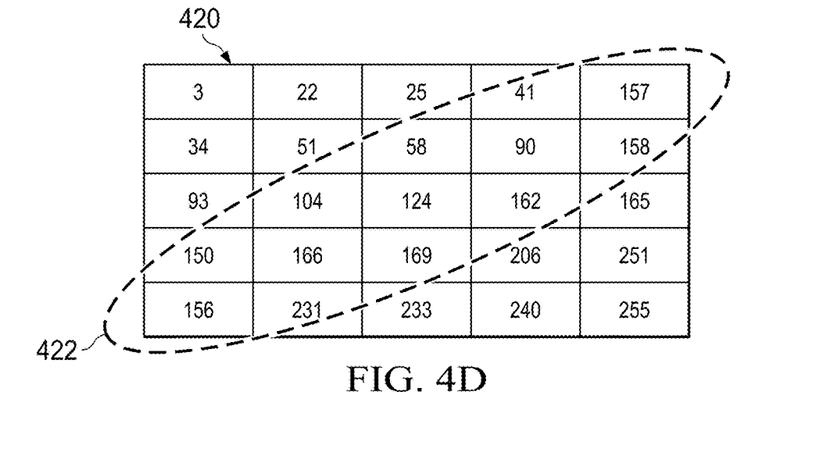

In a third step, a set of pixels in a diagonal portion 422 of array 420 are selected to be sorted again, as illustrated in FIG. 4D. The diagonal portion bisects a lower value region and a higher value region of the second sorted array. The exact orientation of the diagonal portion depends on which order, ascending or descending, the vertical and horizontal sorts are done in. In this example, the diagonal portion includes thirteen pixels of newly ordered 5×5 array 420 that are selected and have to be sorted again. This gives the final true median.

Sorting these in an ascending or descending order gives the true median value of 156 for this example. For this step, any of the well known sorting schemes may be used to converge to the median value. In this manner, the difficult task of doing a sort is reduced from 25 values to just 13 values, which significantly reduces the required number of comparisons. According to equation (1), it may take as many as (13−7)+2.8+3.0+3.1 . . . 3.7 comparisons, which is approximately 29 comparisons, versus 66 comparisons to sort 25 values.

FIGS. 5A-5D illustrate another embodiment for determining a median value in a small array. In this example, rather than sorting all 13 data values of diagonal portion 422, referring again to FIG. 4D, a more efficient sort is performed. Notice that in array 420 the lower values are to the left of diagonal portion 522 while the higher values are to the right of diagonal portion 522. In this embodiment, the diagonal portion is divided into a mid value diagonal portion 522, a lower value diagonal portion 523, and a higher value diagonal portion 526.

Figure 5A:
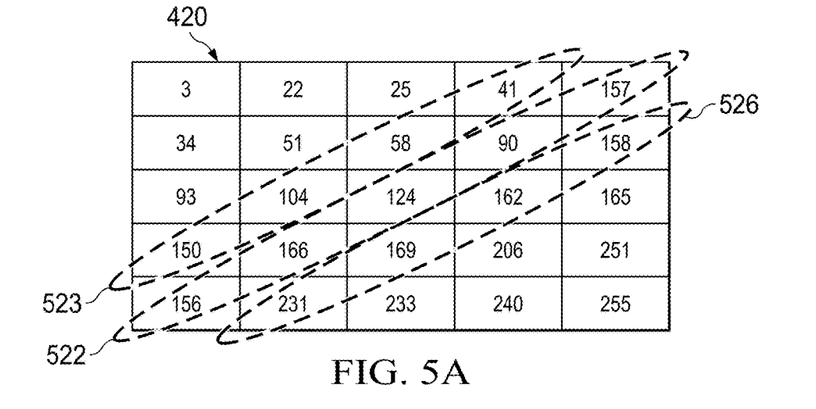
FIGS. 5A-5D illustrate another method for determining a median value in a small array.
Figure 5B:
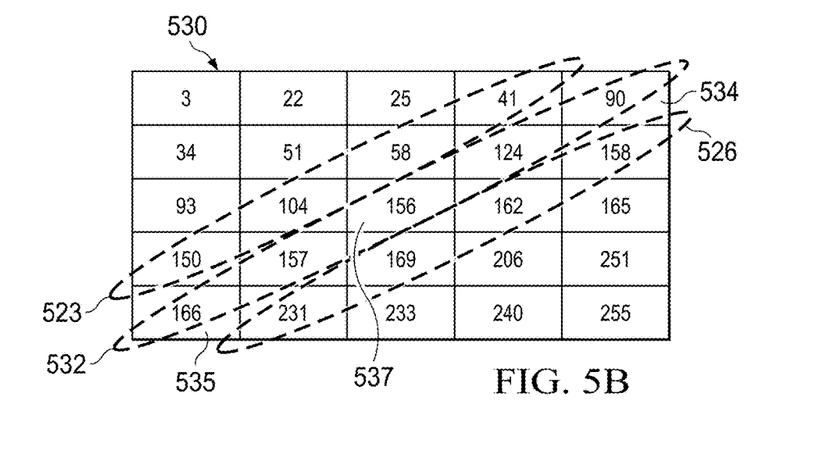

Initially, only the five data values of diagonal portion 522 are sorted in ascending order to produce array 530 with sorted diagonal 532. Then, the four values from the lower value side in diagonal portion 523 may each be compared to the lowest value in sorted diagonal 532, which in this case is the lower value end of diagonal portion 532 indicated at 534, such that the largest value from diagonal portion 523 replaces the value in location 534 if it is larger than the value currently in location 534 to form array 540. In this example, the value of 150 is taken from diagonal portion 523 and replaces the value of 90 that was at location 534.

Figure 5C:
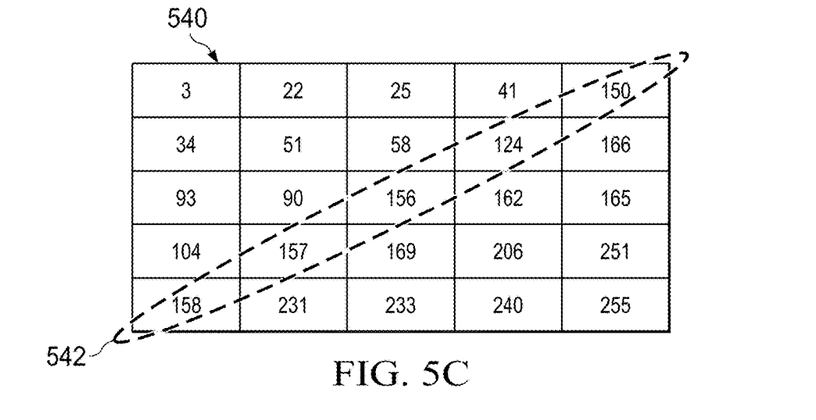
Figure 5D:
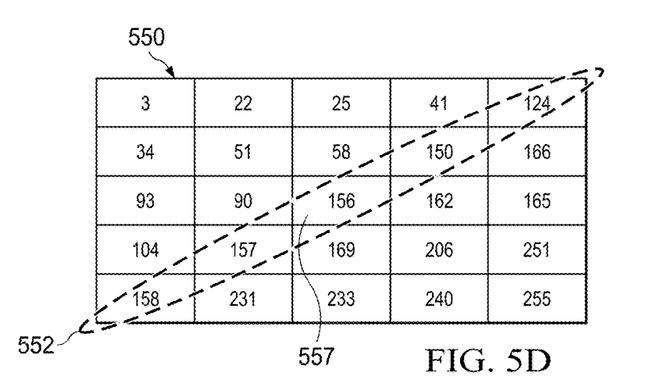

Similarly, the four values from the higher value side in diagonal portion 526 may each be compared to the highest value in sorted diagonal 532, which in this case is the higher value end of diagonal portion 532 indicated at 535, such that the smallest value from diagonal portion 526 replaces the value in location 535 if it is smaller than the value currently in location 535. In this example, the value 158 taken from diagonal portion 526 replaces the value 166 that was in location 535, as shown in FIG. 5C FIG. 5C illustrates the results of the updating the high and low end of mid value diagonal portion 532 to form updated diagonal 542. Finally, updated diagonal portion 542 is again sorted in ascending or descending order and the resulting value in the center location of diagonal portion 552 is the median value. In this example, the median value is 156 as indicated in FIG. 5D at location 557.

For some embodiments, an approximate median value may be determined by simply using the center location of sorted diagonal portion 532 as the median value, as indicated at 537 in FIG. 5B. In this manner, the additional computations required to adjust the sorted diagonal portion 532 based on lower value diagonal portion 533 and higher value diagonal portion 536 may be eliminated.

Performance and Saving

Loading 25 pixels from a 5×5 array and then sorting them using previous linear sorting is not ideal for a vector processor. The techniques described above allow the problem of finding a median value in a small array to be computed in an efficient manner on a vector SIMD processor. Each step may be operated on multiple pixels at a time depending on the load width for that particular SIMD architecture.

For implementations in which there is an overlap between 5×5 blocks, these techniques still work well since simple vertical and horizontal pixel processing is done and can take advantage of the SIMD capabilities.

A transpose feature of certain SIMD architectures may be used after the first column sort so that the horizontal sort may be implemented as a second column sort in order to simplify data loading.

On a vector processor that supports 16-way multiple data processing, this sort of a scheme is capable of producing a 5×5 median every 8 cycles. Typically, >66 cycles are needed to find a median of a 5×5 block using a shell or a merge-sort scheme, assuming the 5×5 block is written in memory as a 1D array of 25 elements. Additional processing is needed to order the elements as a 1D array. Multiple passes of the sort are needed for such implementations with intermediate data being stored.

SIMD Processor Examples

Figure 6:
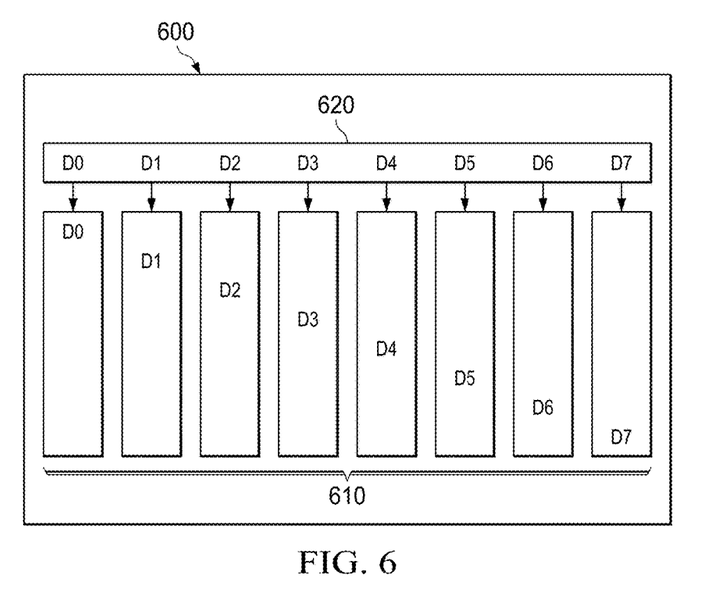
FIG. 6 is a flow diagram illustrating transposition of array data in a multi-bank memory subsystem.

FIG. 6 is a flow diagram illustrating transposition of array data in a multi-bank memory subsystem of SIMD processor

600. In this example, a SIMD processor 600 has an eight way bank of memory 610 that is coupled to an output register 620. Other portions of SIMD processor are not shown in FIG. 6. Control logic within SIMD processor 600 allows the addressing of each memory bank access to be incremented so that a single data store operation from output register 620 will be incrementally spread out in memory 610. In this manner, store operations performed after a column sort as illustrated in FIG. 4B may result in a transposed array, such that the row sort illustrated in FIG. 4C may actually be done as a column sort, for example.

Figure 7:
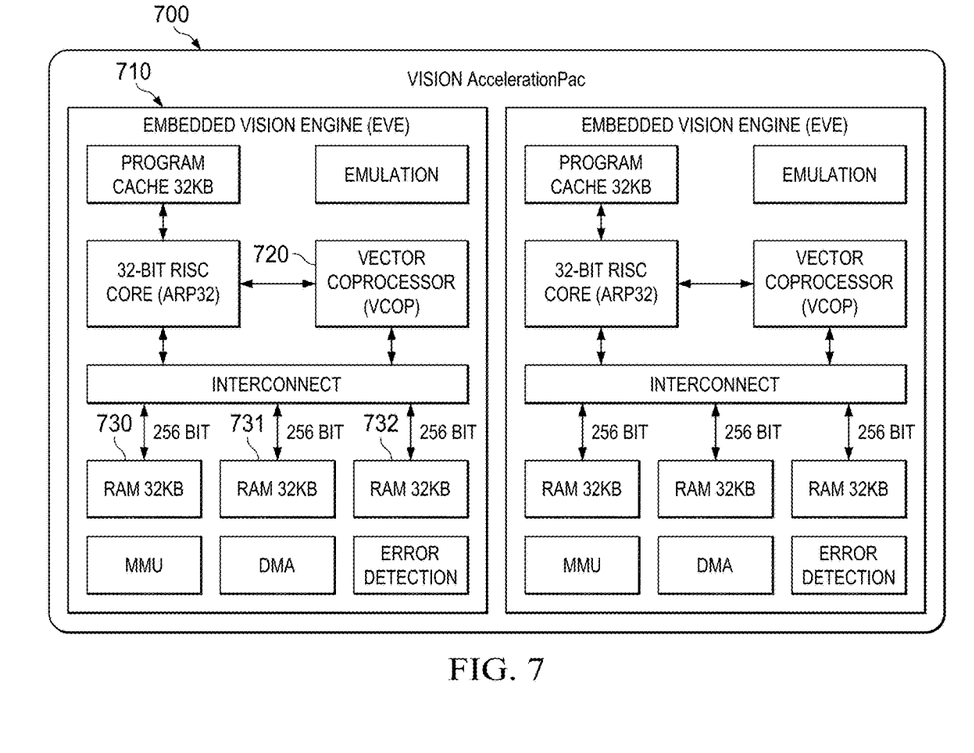
FIG. 7 is a block diagram of an example image processing device.

FIG. 7 is a block diagram of an example image processing device 700. As mentioned above, a SIMD processor core available from Texas Instruments is a vector coprocessor (VCOP) 720 that may be included in an Embedded Vision Engine (EVE) 710, for example. VCOP vector coprocessor 720 is a SIMD engine with built-in loop control and address generation. It provides a dual 8-way SIMD with sixteen 16-bit multipliers per cycle, for 8 GMACS per second at 500-MHz frequency of sustained throughput, sustained by associated loads/stores and built-in zero-looping overheads with rounding and saturation. It has three-source operations, allowing the two vector units to gain an additional 2× and compute thirty-two 32-bit additions in each cycle. VCOP 720 also has eight address generation units each capable of 4-dimensional address to sustain address for four nested loops and three memory interfaces, resulting in zero overhead for four levels of nested looping. This significantly reduces the compute cycles needed for iterative pixel operations. The vector coprocessor has specialized pipelines for accelerating histogram, weighted histogram and lookup tables and supports common computer-vision processing stages such as gradients, orientation, sorting, bit interleaving/de-interleaving/transposing, integral images and local-binary patterns. In addition, the vector coprocessor has specialized instructions with flexible and concurrent load store operation to accelerate the region of interest decoding and a scatter/gather operation for efficient processing of data from non-contiguous memory. This minimizes the conventional data movement and copying needed for traditional image-processing procedures resulting in ultra-fast processing performance. Speedups of 4× to 12× on a diverse range of functions relative to standard processor architectures are common. VCOP 720 natively supports scatter/gather and region of interest processing. Sorting is a common computer vision function that occurs in multiple-use cases such as identifying target features to track, and matching in dense optical flow searches. EVE significantly accelerates sorting with custom instruction support, allowing EVE to sort an array of 2048 32-bit data points in <15.2 μsecs.

EVE is supported by a full set of code-generation tools including an optimizing compiler, simulator integrated into TI's Code Composer Studio IDE (integrated development environment). EVE has built-in support for non-intrusive performance monitoring through hardware counters. This allows users to monitor multiple performance signals while the application runs and allows in-depth monitoring of the application's run-time performance without having to make any code modifications.

One or more VCOP 720 may be included in various system on chip (SoC) integrated circuits. Vision accelerationmodule 700 includes two EVE 710 subsystems, for example. Other SoC implementations may include four or more EVE subsystems, for example.

EVE has a (V0, V1) minmax( ) instruction, that compares vectors V0, V1 and writes the min-values to V0 and max-values to V1. For example, if V0=[4, 3, 45, 23, 21, 100, 56, 21] and V1=[5, 1, 44, 24, 20, 99, 79, 32], then after executing (V0, V1)·minmax( ), the register contents will be: V0=[4, 1, 44, 23, 20, 99, 56, 21] and V1=[5, 3, 45, 23, 21, 100, 79, 32].

Referring again to FIG. 5B, the min-max instruction may be used to compare low value diagonal portion 533 to low end 534, for example. Similarly, the min-max instruction may be used to compare high value diagonal portion 536 to high end value 535, for example.

EVE has a modified store instruction that does a transposition of 8 pixels (8, 16 or 32-bit elements) in a single cycle. The vector core offers the ability to transpose data through memory, that is, convert horizontal rows of loaded data into vertical columns, and vice-versa by using a special store mode, of store with transposition referred to by VCOP kernel-C language as offset_np1( ). The name "offset_np1" is used because each of the three vector core memory interfaces {IBUFL, IBUFH, WBUF} are organized as N (N equals VCOP_SIMD_WIDTH) 32-bit banks, where N is 8, allowing VCOP 720 to load/store 256-bits per vector core cycle from each of the three interfaces for three separate sets of memory banks 730-732, for a total bandwidth of 768 bits. To achieve transposition, the outputs by N memory banks are staggered by plus 1, so that they line up in different banks allowing store with transposition to be a single cycle operation. In the absence of this staggered offset, all VCOP_SIMD_WIDTH elements that need to be stored out fall in the same memory. The staggered offset is N-banks plus 1, named offset_np1 to indicate that each of the VCOP_SIMD_WIDTH elements is now spaced apart by 9 words or 36 bytes, since there are N=8 32-bit banks, as illustrated in FIG. 6. The store with data driven addressing may be used to implement more generalized transposes in a KN+1 geometry, whereas the transpose implements just an N+1 geometry.

The vector core can store either bytes, half-words, or words in a transposed manner while sustaining computations and loads in normal order, allowing it to take data that would have been stored horizontally and very likely falling within the same vector register when loaded, to be stored vertically so that VCOP 720 can easily access them again with full performance in a follow on loop and transpose to get back to normal order. Such a transformation usually happens in the context of separable transforms where there may be a vertical pass and a horizontal pass without incurring any extra cycles. It may also be used to maintain a running sum of 2D block data such as in integral image in vision applications.

Table 1 provides an example of EVE specific Kernel-code that may be executed on an EVE processor to vertically sort all of the columns in a 5×5 array in nine processor cycles, giving 25 elements (5 per column) sorted in 9 cycles. Note: minmax( ) deinterleave( ) and interleave( ) load and store variants are EVE features.

TABLE 1

EVE specific-code for a column sort of a 5 × 5 matrix vertically

```
for ( int l1 = 0; l1 < (w_blk)/VCOP_2SIMD_WIDTH; l1++)
{
    __vector c2l_0, c2m_0, c2h_0;
    __vector c2l_1, c2m_1, c2h_1;
    c2l_0 = 0;                    /* Initialize the columns to get started. */
    c2m_0 = 0;
    c2h_0 = 0;
    c2l_1 = 0;
    c2m_1 = 0;
    c2h_1 = 0;
    for (int l2 = 0; l2 < h_blk; l2++ )
    {
      __agen dataAddr0;
      __agen dataAddr1;
      dataAddr0 =   (l2 * w_blk * ELEMSZ_IN ) + (l1 * 2 * VECTORSZ_IN );
      dataAddr1 =   (l2 * 5 * w_blk * ELEMSZ_IN ) + (l1 * 2 * VECTORSZ_IN );
                        /* Read in the latest column.   */
      (c_e1, c_o1) =  (in + (0 * w_blk * ELEMSZ_IN) )[dataAddr0].deinterleave( );
      (c_e2, c_o2) =  (in + (1 * w_blk * ELEMSZ_IN) )[dataAddr0].deinterleave( );
      (c_e3, c_o3) =  (in + (2 * w_blk * ELEMSZ_IN) )[dataAddr0].deinterleave( );
      (c_e4, c_o4) =  (in + (3 * w_blk * ELEMSZ_IN) )[dataAddr0].deinterleave( );
      (c_e5, c_o5) =  (in + (4 * w_blk * ELEMSZ_IN) )[dataAddr0].deinterleave( );
                  /* Sort the latest column into low, middle and high values. */
                  /* if ( c2l > c2h ) { tmp = c2l; c2l = c2h; c2h = tmp; } */
                  /* if ( c2l > c2m ) { tmp = c2l; c2l = c2m; c2m = tmp; } */
                  /* if ( c2m > c2h ) { tmp = c2m; c2m = c2h; c2h = tmp; } */
      (c_e1, c_e2).minmax( );
      (c_o1, c_o2).minmax( ); // cycle 1
      (c_e2, c_e3).minmax( );
      (c_o2, c_o3).minmax( ); // cycle 2
      (c_e3, c_e4).minmax( );
      (c_o3, c_o4).minmax( ); // cycle 3
      (c_e4, c_e5).minmax( );
      (c_o4, c_o5).minmax( ); // cycle 4
      (c_e1, c_e2).minmax( );
      (c_o1, c_o2).minmax( ); // cycle 5
      (c_e2, c_e3).minmax( );
      (c_o2, c_o3).minmax( ); // cycle 6
      (c_e3, c_e4).minmax( );
      (c_o3, c_o4).minmax( ); // cycle 7
      (c_e1, c_e2).minmax( );
      (c_o1, c_o2).minmax( ); // cycle 8
      (c_e2, c_e3).minmax( );
      (c_o2, c_o3).minmax( ); // cycle 9
                      /* Write the values out.                  */
      (scratch1 + (0  * w_blk * ELEMSZ_IN ) ) [dataAddr1].interleave( ) = (c_e1, c_o1);
      (scratch1 + (1  * w_blk * ELEMSZ_IN ) ) [dataAddr1].interleave( ) = (c_e2, c_o2);
      (scratch1 + (2  * w_blk * ELEMSZ_IN ) ) [dataAddr1].interleave( ) = (c_e3, c_o3);
      (scratch1 + (3  * w_blk * ELEMSZ_IN ) ) [dataAddr1].interleave( ) = (c_e4, c_o4);
      (scratch1 + (4  * w_blk * ELEMSZ_IN ) ) [dataAddr1].interleave( ) = (c_e5, c_o5);
    }
}
```

Larger Arrays

VCOP 720 is an 8-way parallel SIMD machine with two functional units operating on eight elements at a time. Its vector registers hold eight elements and computes happen on eight pixels at a time. However, VCOP 720 may operate on much larger blocks of data contained in its internal memories. Therefore, a simple horizontal/vertical sort type function may be done on any block size as the vector processor 720 has the capability of zero overhead looping up to 4 levels. Once compute width/height/horizontal skip/vertical skip details are known, the vector core processes all pixels in the compute width X compute height block without exiting the vector core. The array block may be >>8×8, for example.

Referring again to FIG. 4D, after doing the row and column sort of an array, which may be performed in a very efficient manner on EVE 710, diagonal portion 422 may need to be sorted, which may be less efficient computation wise. For a larger array size, such as a 7×7 array, for example, it may be more efficient to first perform a column and row sort as illustrated in FIGS. 4B, 4C and then form a resultant diagonal portion into a smaller array, such as a 5×5, for example. The smaller 5×5 array may then be processed with a column and row sort as illustrated in FIGS. 4B, 4C. The resultant smaller diagonal portion may them be further sorted to determine the median value as described in FIG. 4D or FIGS. 5A-5D, for example.

Figure 8:
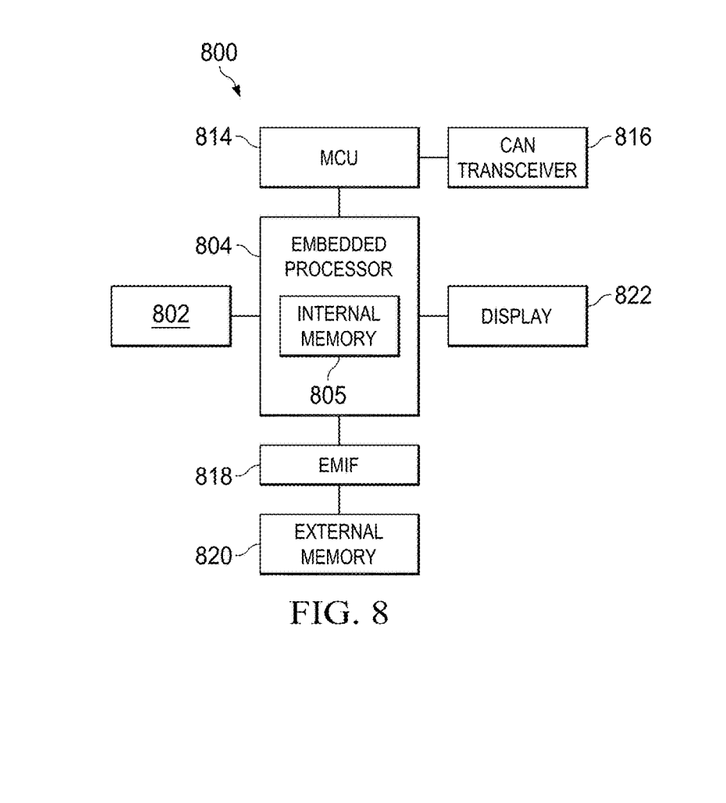
FIG. 8 is a block diagram of an automotive vision control system.

Embodiments of the techniques for finding the median of an array as described above may be implemented for virtually any type of SIMD system with functionality to capture image and/or to receive images from other devices over a network (e.g., a desk top computer, a laptop computer, a tablet computing device, a netbook computer, a handheld device such as a mobile (i.e., cellular) phone, a personal digital assistant, a digital camera, an embedded system, etc.). FIG. 8 is a block diagram of an example digital system that may be configured to perform an embodiment of the techniques described above. More specifically, FIG. 8 is a block diagram of an embedded automotive vision control system 800 suitable for use in a vehicle.

The imaging system 802 is configured to capture images of a scene and may include, for example an imaging sensor system (lens assembly, lens actuator, and imaging sensor), circuitry for converting analog image signals to digital image signals, and circuitry for controlling various aspects of the operation of the imaging system 802, such as, for example, aperture opening amount, exposure time, etc.

Software instructions implementing some or all the functionality of the method of FIGS. 4A-4D, for example, may be stored in the external memory 820 and executed by the embedded processor 804 to search images received from the imaging system 802. Software instructions implementing a driver assistance application such as forward collision warning, visual parking, and/or navigation assistance, automatic braking control, etc., may also be stored in the external memory 820 and executed on the embedded processor 804. The software instructions may be initially stored in a computer readable medium and loaded and executed by the embedded processor 804. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

The embedded processor 804 may be any suitable SIMD processor that provides the needed computation performance, such as, for example, a vector SIMD as described in more detail above. The internal memory 805 may be any suitable memory design, e.g., static random access memory (SRAM). The embedded processor 804 is coupled to external memory 820 via an external memory interface (EMIF) 818. The embedded processor 804 included functionality to move instructions and/or data between the external memory 820 and the internal memory 805 via the EMIF 818 as needed for image processing and application processing.

The external memory 820 may be any suitable memory design may be used. For example, the external memory 820 may include DRAM such as synchronous DRAM (SDRAM) or double data rate DRAM (DDR DRAM), flash memory, a combination thereof, or the like.

The display 822 may be any suitable display device. The information provided on the display depends on the particular application or applications of the system 800. For example, the display 822 may be used by a parking assistance application.

The microcontroller (MCU) 814 may be a general purpose microcontroller configured to handle system control functions such as steeper motors in real time as well as communication with other modules in the vehicle. The controller area network (CAN) transceiver provides a network protocol for serial communication with various control modules in the vehicle.

Figure 9:
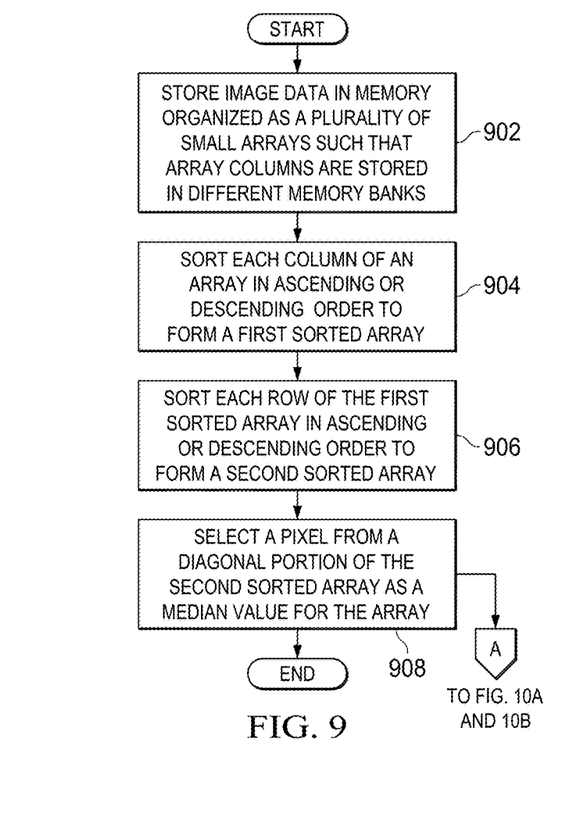
FIG. 9 is a flow diagram illustrating a method for a determining a median value of an array of data.

FIG. 9 is a flow diagram illustrating a computer implemented method for determining a median value of an array of pixels in a vision system. An image may be captured by a camera or other source of input data and stored in memory organized as a plurality of small arrays such that array columns are stored 902 in different memory banks. This allows each column of the array to be accessed simultaneously by a SIMD processor. Each column of an array may then be sorted 904 in ascending order to form a first sorted array. While ascending order is mentioned, each column may instead be sorted in descending order; the order of the sort is immaterial.

Each row of the first sorted array is then sorted 906 in ascending order to form a second sorted array. While ascending order is mentioned, each row may instead be sorted in descending order; the order of the sort is immaterial. As mentioned above, the row sort may actually be implemented by first transposing the first array and then doing a column sort. The transposition may be done during a store of the first array, as described in more detail above. The second array may similarly be transposed when it is stored, or may be stored without transposition.

A pixel is then selected 908 as the median value from a diagonal portion of the second sorted array, wherein the diagonal portion bisects a lower value region and a higher value region of the second sorted array. The orientation of the diagonal portion is determined by the order of sorting (ascending or descending) and whether the second array is transposed or not.

In some embodiments, an approximate median value may be selected by simply selecting a value from the center of the second array. This will not always produce the correct median value, but it may provide results that are sufficient for some applications.

Figure 10A:
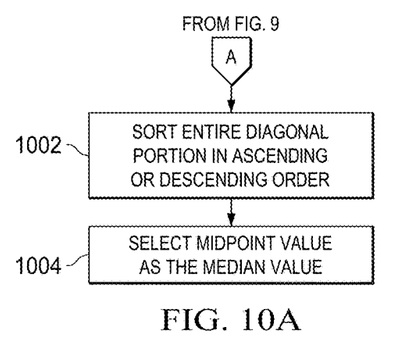
FIGS. 10A-10B are flow diagrams illustrating different embodiments for sorting a diagonal portion of an array.
Figure 10B:
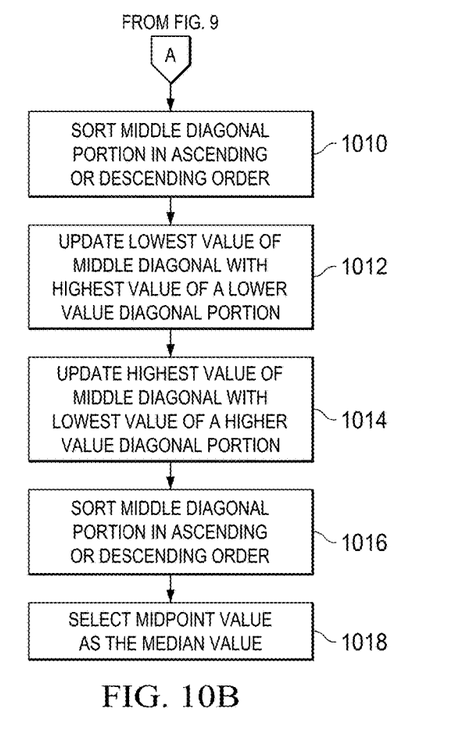

FIGS. 10A-10B are flow diagrams illustrating different embodiments for sorting a diagonal portion. For a more accurate result, the entire diagonal portion may be sorted 1002 in ascending (or descending) order to form a sorted list. The midpoint of this sorted list may then be selected 1004 as the exact median value of the array. Referring back to FIG. 4D, the entire diagonal portion of a 5×5 array is indicated by portion 422. In general, the entire diagonal portion will include about half of the pixels in the array.

In FIG. 10B, the entire diagonal portion is divided into a low value diagonal portion 523, a mid value diagonal portion 522 and a high value diagonal portion 526, referring again to FIG. 5A. The mid value diagonal portion is first sorted 1010 in ascending or descending order, as illustrated in FIG. 5B, 532. An element at a low value end of the mid value diagonal may then be updated 1012 with a maximal value of the low value diagonal and the low value end. This may be done using a min-max instruction as described above, for example.

An element at a high value end of the mid value diagonal may be updated 1014 with a minimal value of the high value diagonal and the high value end. This may be done using a min-max instruction as described above, for example.

The resulting mid value diagonal may then be sorted 1016 in ascending or descending order to form a sorted mid value diagonal. The midpoint pixel value of the mid value diagonal may then be selected 1018 as the median value of the array.

In some embodiments, the mid value diagonal may be sorted in ascending order prior to replacing the high end value.

In this manner, a median value of an array may be found in an efficient manner using parallel computing resources of a SIMD processing engine.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein for an image system for a vehicle. In other embodiments, a vision system may be used for manufacturing applications, robotic applications, security applications, etc., for example.

While the descriptions herein referred to a vision system, other embodiments may be used to process arrays of data for other applications, such as: seismic processing, weather prediction processing, fluidic data processing, etc., for example. Thus, references to pixel data may also be interpreted to be any type of data that may be processed in array form.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A computer implemented method for determining a median value of an array of pixels, the method comprising:
    sorting each column of an array in ascending or descending order to form a first sorted array, wherein all of the columns are sorted in a parallel manner by a single instruction, multiple data (SIMD) processor;
    sorting each row of the first sorted array in a parallel manner by the SIMD processor in ascending or descending order to form a second sorted array;
    generating a third sorted array by sorting a mid value diagonal of a diagonal portion of the second sorted array and without sorting all elements of diagonals adjacent to the mid value diagonal, the diagonal portion bisecting a lower value region and a higher value region of the second sorted array; and
    selecting a pixel as the median value from the mid value diagonal of the third sorted array.

2. The method of claim 1, further comprising transposing the first sorted array to form a transposed array prior to sorting each row of the first sorted array, such that sorting each row of the first sorted array is performed by sorting each column of the transformed array in a parallel manner by the SIMD processor.

3. The method of claim 1, wherein selecting a pixel as the median value selects a pixel in a central position of the third sorted array, whereby an approximate median value is selected.

4. The method of claim 1, wherein the diagonal portion of the second sorted array includes a low value diagonal, a high value diagonal, and the mid value diagonal, wherein generating the third sorted array includes:
    sorting the mid value diagonal to form a sorted mid value diagonal;
    updating an element at a low value end of the sorted mid value diagonal with a maximal value of the low value diagonal and the low value end;
    updating an element at a high value end of the sorted mid value diagonal with a minimal value of the high value diagonal and the high value end; and
    sorting the resulting mid value diagonal to form an updated sorted mid value diagonal to generate the third sorted array, and
    wherein selecting the pixel as the median value includes selecting a pixel in a central position of the updated sorted mid value diagonal.

5. The method of claim 4, further comprising sorting the sorted mid value diagonal prior to replacing the element at the high value end of the mid value diagonal.

6. The method of claim 1, wherein the diagonal portion of the second sorted array includes a low value diagonal, a high value diagonal, and the mid value diagonal, wherein generating the third sorted array includes:
    sorting the mid value diagonal to form a sorted mid value diagonal, and
    wherein selecting the pixel as the median value includes selecting a pixel in a central position of the sorted mid value diagonal, whereby an approximate median value is selected.

7. A non-transitory computer readable medium storing software instructions that, when executed by at least one single instruction, multiple data (SIMD) processor, cause the SIMD processor to:
    sort each column of an array in ascending or descending order to form a first sorted array, wherein all of the columns are sorted in a parallel manner by the SIMD processor;
    sort each row of the first sorted array in a parallel manner by the SIMD processor in ascending or descending order to form a second sorted array;
    generate a third sorted array by sorting a mid value diagonal of a diagonal portion of the second sorted array and without sorting all elements of diagonals adjacent to the mid value diagonal, the diagonal portion bisecting a lower value region and a higher value region of the second sorted array; and
    select a pixel as a median value from the mid value diagonal of the third sorted array.

8. The non-transitory computer readable medium of claim 7, further comprising instructions that cause the at least one SIMD processor to transpose the first sorted array to form a transposed array prior to sorting each row of the first sorted array, such that sorting each row of the first sorted array is performed by sorting each column of the transformed array in a parallel manner by the SIMD processor.

9. The non-transitory computer readable medium of claim 7, wherein the instructions that cause the at least one SIMD processor to select the pixel as the median value include instructions that cause the at least one SIMD processor to select a pixel in a central position of the third sorted array, whereby an approximate median value is selected.

10. The non-transitory computer readable medium of claim 7, wherein the diagonal portion of the second sorted array includes a low value diagonal, a high value diagonal, and the mid value diagonal, wherein the instructions that cause the at least one SIMD processor to generate the third sorted array include instructions that cause the at least one SIMD processor to:
    sort the mid value diagonal to form a sorted mid value diagonal;

update an element at a low value end of the sorted mid value diagonal with a maximal value of the low value diagonal and the low value end;

update an element at a high value end of the sorted mid value diagonal with a minimal value of the high value diagonal and the high value end; and sort the resulting mid value diagonal to form an updated sorted mid value diagonal to generate the third sorted array, and wherein the instructions that cause the at least one SIMD processor to select the pixel as the median value include instructions that cause the at least one SIMD processor to select a pixel in a central position of the updated sorted mid value diagonal.

11. The non-transitory computer readable medium of claim 10, further comprising instructions that cause the at least one SIMD processor to sort the sorted mid value diagonal prior to replacing the element at the high value end of the mid value diagonal.

12. The non-transitory computer readable medium of claim 7, wherein the diagonal portion of the second sorted array includes a low value diagonal, a high value diagonal, and the mid value diagonal, wherein the instructions that cause the at least one SIMD processor to generate the third sorted array include instructions that cause the at least one SIMD processor to:

sort the mid value diagonal to form a sorted mid value diagonal, and wherein the instructions that cause the at least one SIMD processor to select the pixel as the median value include instructions that cause the at least one SIMD processor to select a pixel in a central position of the sorted mid value diagonal, whereby an approximate median value is selected.

13. A computer vision system comprising:

a camera coupled to provide an array of pixel data to a memory array;

a single instruction, multiple data (SIMD) processor coupled to the memory array and to an instruction memory, wherein the SIMD processor is configured to:

sort each column of the array of pixel data in ascending or descending order to form a first sorted array, wherein all of the columns are sorted in a parallel manner by the SIMD processor;

sort each row of the first sorted array in a parallel manner by the SIMD processor in ascending or descending order to form a second sorted array;

generate a third sorted array by sorting a mid value diagonal of a diagonal portion of the second sorted array and without sorting all elements of diagonals adjacent to the mid value diagonal, the diagonal portion bisecting a lower value region and a higher value region of the second sorted array; and select a pixel as the median value from the mid value diagonal of the third sorted array.

14. The system of claim 13, wherein the SIMD processor is further configured to transpose the first sorted array to form a transposed array prior to sorting each row of the first sorted array, such that sorting each row of the first sorted array is performed by sorting each column of the transformed array in a parallel manner by the SIMD processor.

15. The system of claim 13, wherein the SIMD processor is further configured to select a pixel in a central position of the third sorted array, whereby an approximate median value is selected.

* * * * *